US007526756B2

(12) United States Patent
Bates et al.

(10) Patent No.: US 7,526,756 B2
(45) Date of Patent: Apr. 28, 2009

(54) ADDRESS WATCH BREAKPOINTS WITH BASING POINTERS

(75) Inventors: Cary Lee Bates, Rochester, MN (US);
Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/955,736

(22) Filed: Sep. 30, 2004

(65) Prior Publication Data

US 2006/0070039 A1    Mar. 30, 2006

(51) Int. Cl.
*G06F 9/44* (2006.01)
(52) U.S. Cl. .................. 717/129; 717/127; 717/128
(58) Field of Classification Search ............... None
See application file for complete search history.

(56) References Cited

U.S. PATENT DOCUMENTS 5,093,914 A  *  3/1992  Coplien et al. ............. 717/129
6,769,116 B1 *  7/2004  Sexton ..................... 717/130
7,058,928 B2 *  6/2006  Wygodny et al. .......... 717/128

OTHER PUBLICATIONS

Shay Rojansky, DDD-Data Display Debugger, pulbished by Linux Journal Oct. 1, 1997, pp. 1-4.*

Debugging C++ Programs Using the SAS/C Debugger: Specifying Expressions, http://66.218.71.225/search/cache?p=debugger+base+pointer+watch&ei=UTF=8&cop-ms. . ., Feb. 10, 1998, pp. 1-4, SAS Institute, Cary USA.

* cited by examiner

*Primary Examiner*—Tuan Q Dam
*Assistant Examiner*—Zheng Wei
(74) *Attorney, Agent, or Firm*—Owen J. Gamon (57) ABSTRACT

A method, apparatus, system, and signal-bearing medium that, in an embodiment, receive a request for an address watch breakpoint to a variable, determine that the variable is referenced via a basing pointer expression, and monitor for initialization of the basing pointer prior to monitor for a change to the contents of the variable that is pointed to by the basing pointer expression. In an embodiment, the basing pointer expression is implemented as an instruction that uses an indirect addressing mode. In an embodiment, the basing pointer is determined to be uninitialized, and thus needs monitoring for initialization, by detecting an error that results from adding an offset for the variable to the contents of the basing pointer, or by detecting an error when the result of the adding is used as a pointer. In an embodiment, the basing pointer expression comprises a plurality of basing pointers, each of which is monitored for initialization in turn. In this way, the user is freed from the difficulty involved in attempting to determine where and if the basing pointer is set prior to monitoring for a modification to a variable that is pointed to by the basing pointer.

20 Claims, 7 Drawing Sheets

| PENDING WATCH RECORDS | | |
|---|---|---|
| ADDRESS BEING WATCHED ⌐515 | EXPRESSION ⌐520 | PENDING ⌐525 |
| C022AF34 | PTR -> A | TRUE |
|  |  |  |

ADDRESS WATCH BREAKPOINTS WITH BASING POINTERS

FIELD

An embodiment of the invention generally relates to computers. In particular, an embodiment of the invention generally relates to address watch breakpoints that use basing pointers or pointer expressions.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug the program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming and may require the programmer to step through many program instructions that are known to be error-free before a set of instructions to be analyzed is finally executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until the breakpoint is reached. The debugger then stops execution of the program and displays the results of the program and/or the state of the computer system to the programmer for analysis, typically via a debugger user interface.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without needing to step through irrelevant portions of a computer program.

But, sometimes the user does not know the address of the instruction to be analyzed. Instead, the user knows the name of a variable or an address of a storage location used by the program that the program may eventually modify, and the user would like the debugger to stop the program when the program modifies the contents at that storage location or in that variable. To address this need, some debuggers have a special breakpoint function, called an address watch breakpoint (AWB). When the program being debugged modifies the contents of the storage location specified by the address watch breakpoint, the debugger stops the program at the instruction that is modifying the storage. Thus, an address watch breakpoint instruction is a load or store instruction accessing a location within a memory page being monitored as an address watch breakpoint.

One of the problems with address watch breakpoints is when the user attempts to set an address watch breakpoint to a variable referenced by a basing pointer or pointer expression, which is not yet set (the basing pointer does not yet contain a valid address). Current debuggers typically use hardware watch capabilities to implement the address watch breakpoint, which require the debuggers to resolve the pointer expression to be watched to obtain a single address to watch. If the basing pointer is not yet set, the expression cannot be resolved, and the single address cannot be obtained.

In an attempt to work around this problem, users sometimes try to run the program being debugged until the basing pointer is set and then set the address watch breakpoint. Unfortunately, determining when a basing pointer has been set is no easy task. The user must make an initial guess where the basing pointer might be set, run the program for a time, perhaps stepping or setting breakpoints near where the pointer might be set, and then manually check to see if the pointer is set. If the pointer is not yet set, then the user must try again until the pointer is set. Further, if the user has allowed the program to run too far, the user must start the process over again with some different breakpoints and/or number of steps. Even worse, finally finding a location in the program where the basing pointer is set does not necessarily end the difficulty because timing issues can cause further complications. Timing problems caused by the delay in setup (hitting a breakpoint, then setting the watch) may cause the address watch breakpoint to not fire in the same way compared to the normal operating environment where the program runs without the breakpoint. Timing issues are particularly troublesome when the program has multiple threads or interacts with other programs, tasks, or jobs running concurrently. Thus, the timing issues may cause the error or bug under investigation to be difficult to reproduce when address watch breakpoints are used with basing pointers.

Hence, without a better way to handle address watch breakpoints directed to variables that are referenced via basing pointers, developers will continue to experience delay, frustration, and difficulty when debugging programs.

SUMMARY

A method, apparatus, system, and signal-bearing medium are provided that, in an embodiment, receive a request for an address watch breakpoint to a variable, determine that the variable is referenced via a basing pointer expression, and monitor for initialization of the basing pointer prior to monitor for a change to the contents of the variable that is pointed to by the basing pointer expression. In an embodiment, the basing pointer expression is implemented as an instruction that uses an indirect addressing mode. In an embodiment, the basing pointer is determined to be uninitialized, and thus needs monitoring for initialization, by detecting an error that results from adding an offset for the variable to the contents of the basing pointer, or by detecting an error when the result of the adding is used as a pointer. In an embodiment, the basing pointer expression comprises a plurality of basing pointers, each of which is monitored for initialization in turn. In this way, the user is freed from the difficulty involved in attempting to determine where and if the basing pointer is set prior to monitoring for a modification to a variable that is pointed to by the basing pointer.

DETAILED DESCRIPTION

Figure 1:
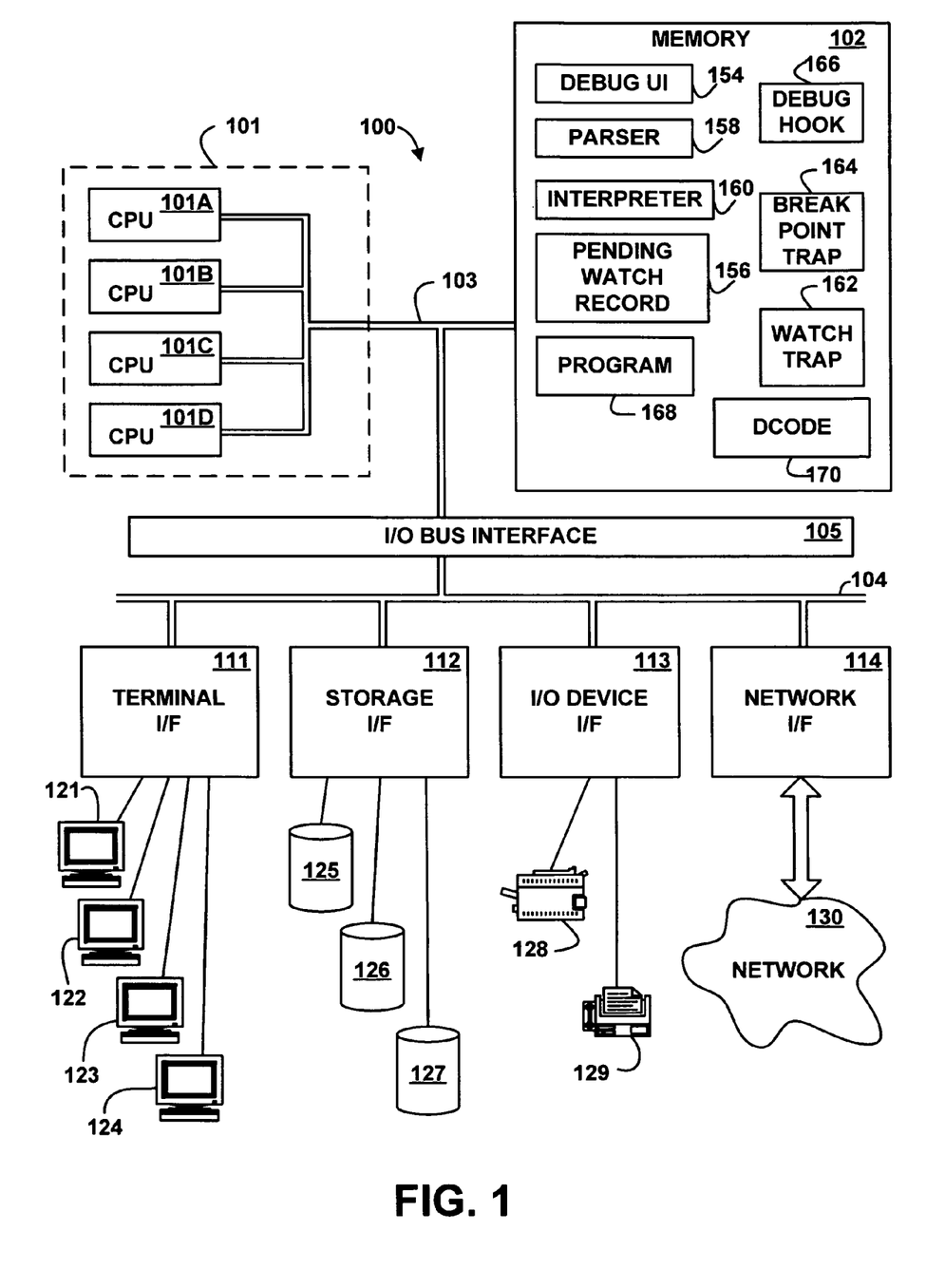
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a debug user interface 154, pending watch records 156, a parser 158, an interpreter 160, a watch trap handler 162, a breakpoint trap handler 164, a debug hook 166, a program 168, and dcode 170. Although the debug user interface 154, the pending watch records 156, the parser 158, the interpreter 160, the watch trap handler 162, the breakpoint trap handler 164, the debug hook 166, the program 168, and the dcode 170 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the debug user interface 154, the pending watch records 156, the parser 158, the interpreter 160, the watch trap handler 162, the breakpoint trap handler 164, the debug hook 166, the program 168, and the dcode 170 are illustrated as being contained within the main memory 102, these elements are not necessarily all completely contained in the same storage device at the same time.

In an embodiment, the debug user interface 154 and the interpreter 160 include instructions capable of executing on the processor 101 or statements capable of being interpreted by instructions executing on the processor 101 to perform the functions as further described below with reference to FIGS. 6 and 7. In another embodiment, the debug user interface 154 and the interpreter 160 may be implemented in microcode. In another embodiment, the debug user interface 154 and the interpreter 160 may be implemented in hardware via logic gates and/or other appropriate hardware techniques.

The program 168 is a program being debugged. The parser 158 evaluates debug commands from the debug user interface 154 to create the dcode 170, which the interpreter 160 interprets for execution on the processor 101. The dcode 170, when executed by the interpreter 160 on the processor 101, modifies an address that is being watched by an address watch breakpoint, which the user requests via the debug user interface 154. The interaction of the debug user interface 154, the parser 158, the interpreter 160, the watch trap handler 162, the breakpoint trap handler 164, and the debug hook 166 are further described below with reference to FIG. 2. An example of the dcode 170 is further described below with reference to FIG. 3B. The address watch breakpoint is further described below with reference to FIGS. 4A and 4B.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
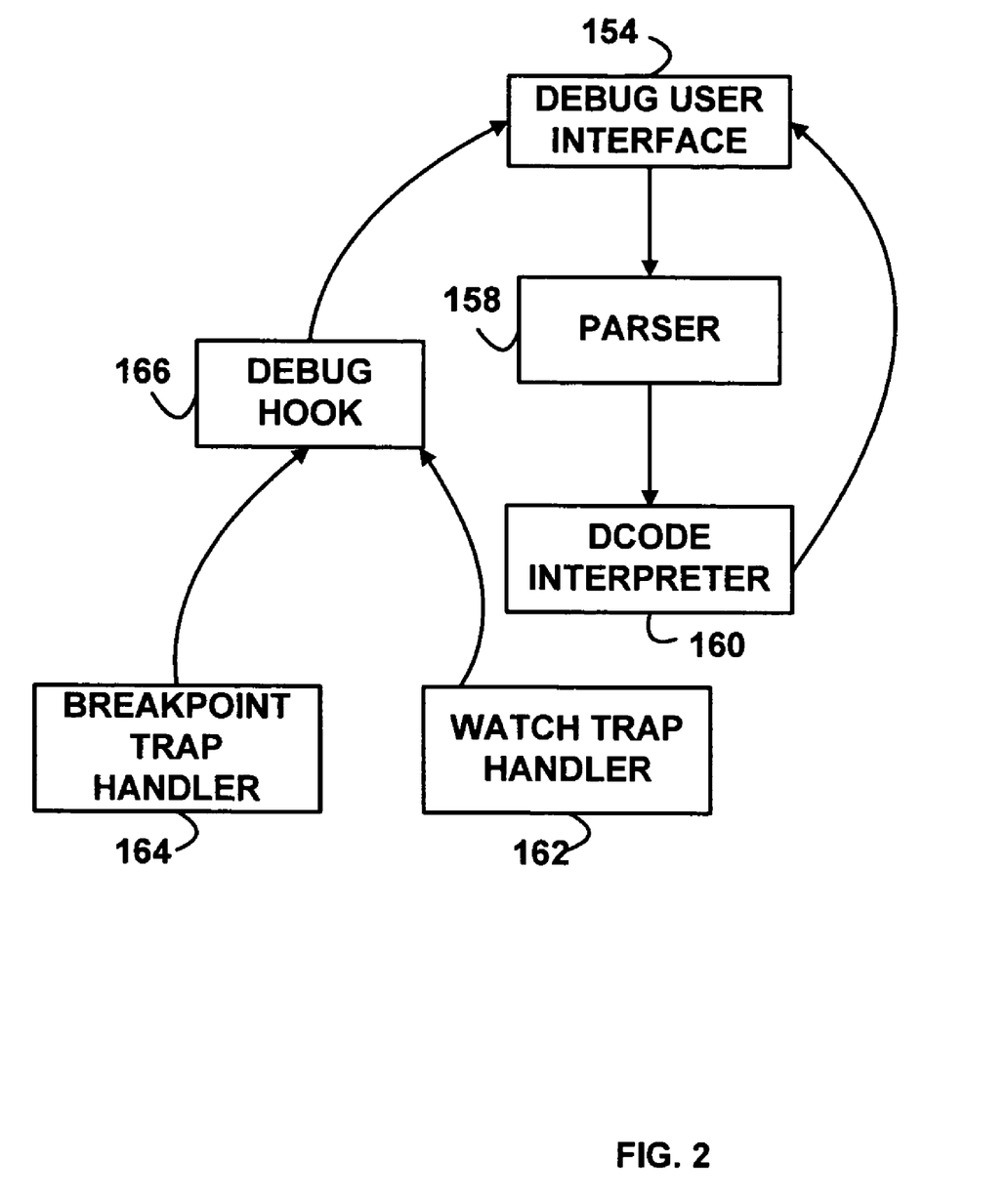
FIG. 2 depicts a block diagram of selected components of the example system, according to an embodiment of the invention.

FIG. 2 depicts a block diagram of selected components of the example system, according to an embodiment of the invention. Illustrated are the debug user interface 154, the parser 158, the interpreter 160, the watch trap handler 162, the breakpoint trap handler 164, and the debug hook 166.

The debug user interface 154 provides address watch break-points to be established by interacting with a user. In some embodiments, the user may define these break-points by issuing a debugger command that refers to high-level language (HLL) references in the program 168 (FIG. 1), such as line or statement numbers or software object references such as a program or module name, from which the physical storage address may be cross referenced. In various embodiments, the debugger command may be issued on a command line or through a graphical user interface.

The parser 158 parses this debugger command using a table that was produced by a compiler or interpreter stored with the computer program 170 to map the line number in the debugger command to the actual physical storage address in the memory 102. The dcode interpreter 160 stores this information in an unillustrated breakpoint table. The dcode interpreter 160 further runs a dcode program to interpret instructions in the dcode 170 and to set the address watch break-points in the program 168.

After the breakpoints are set, the user provides an input to the debug user interface 154 that resumes execution of the program 168. Execution of the program 168 eventually results in an encounter of a break-point. In the illustrative embodiment, this is accomplished by an add instruction that fails, causing a system exception. The watch trap handler 162 or the breakpoint trap handler 164 passes information regarding the exception or interrupt to the debug hook 166.

Then, the debug user interface 154 utilizes the debug hook 166 in order to obtain debugger commands, especially when a break-point has halted program execution. The additional step of the debug hook 166 is illustrated for instances where an interface is required between the debug user interface 154 and the watch trap handler 162 and/or the breakpoint trap handler 164. In an embodiment, the debug hook 166 may utilize an unillustrated result buffer to cache data for the debug user interface 154.

Figure 3A:
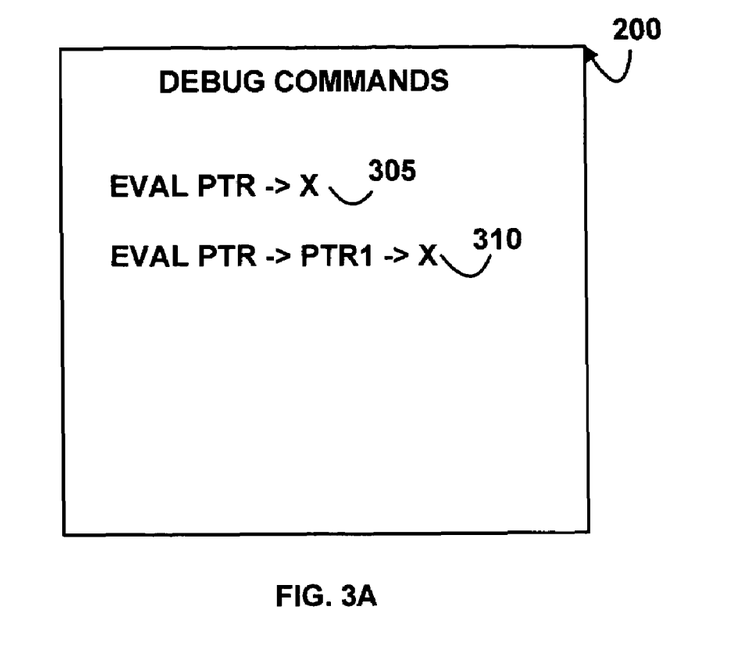
FIG. 3A depicts a block diagram of example debug commands, according to an embodiment of the invention.

FIG. 3A depicts a block diagram of example debug commands 200, according to an embodiment of the invention. The debug commands 200 are entered via the debug user interface 154. The example debug commands include commands 305 and 310, which are both pointer expressions. The statement 305 is a single pointer reference and indicates that the variable "X" is to be found at an address contained in the basing pointer "PTR." The statement 310 is a double pointer reference and indicates that the variable X is to be found at an address contained in the basing pointer "PTR1," and the basing pointer PTR1 is to be found at an address contained in the basing pointer "PTR." Pointer references may have any number of basing pointers. If the user desires to set an address watch breakpoint on the contents of the variable X, the pointer PTR must be initialized before the interpreter 160 can find the address of the variable X for statement 305. Further, the pointers PTR and PTR1 must be initialized before the interpreter 160 can find the address of the variable X for the statement 310. Those skilled in the art will appreciate that in some languages, the basing pointer need not be specified to access the variable (Eval X). In such languages, locating the correct basing pointer can be a challenge.

Figure 3B:
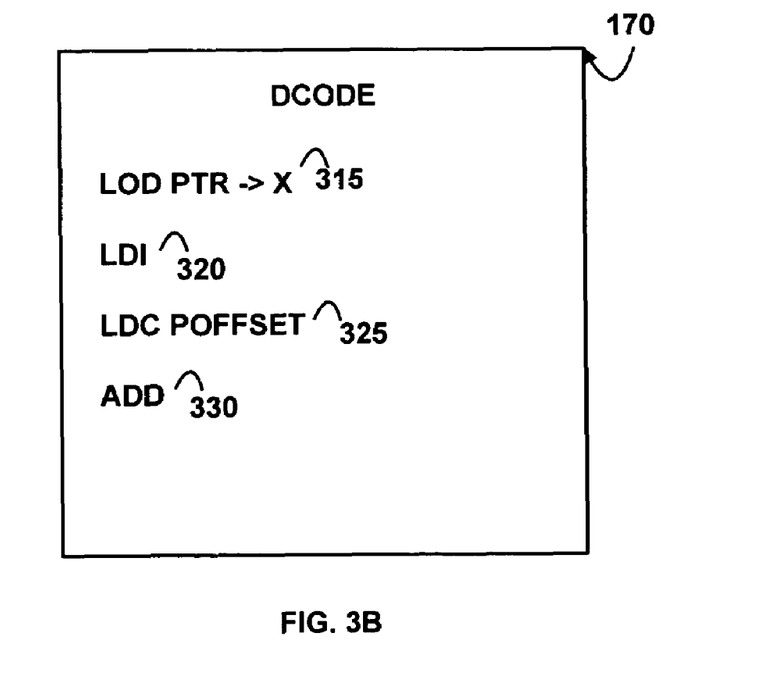
FIG. 3B depicts a block diagram of an example dcode program resulting from a debug command, according to an embodiment of the invention.

FIG. 3B depicts a block diagram of an example dcode program 170 resulting from a debug command, according to an embodiment of the invention. The example dcode program 170 includes instructions 315, 320, 325, and 330, which the parser 158 created from the expression 305 and which the interpreter 160 interprets. The instruction 315 is a load instruction using direct addressing that loads an address of the pointer PTR. The instruction 320 is a load instruction with a pointer type that uses indirect addressing to load the contents of the pointer PTR. The instruction 325 is a load constant instruction that loads the immediate value of POFFSET. The instruction 330 is an add instruction that adds the value of the pointer PTR and the constant POFFSET to obtain an address of the variable X. If the pointer PTR was not set to a valid memory address at the time the instruction 320 is executed, the add instruction 330 will fail. In another embodiment, instead of the add instruction 330 failing, a later instruction that attempts to dereference the pointer PTR fails since the pointer PTR does not contain a valid address.

Figure 4A:
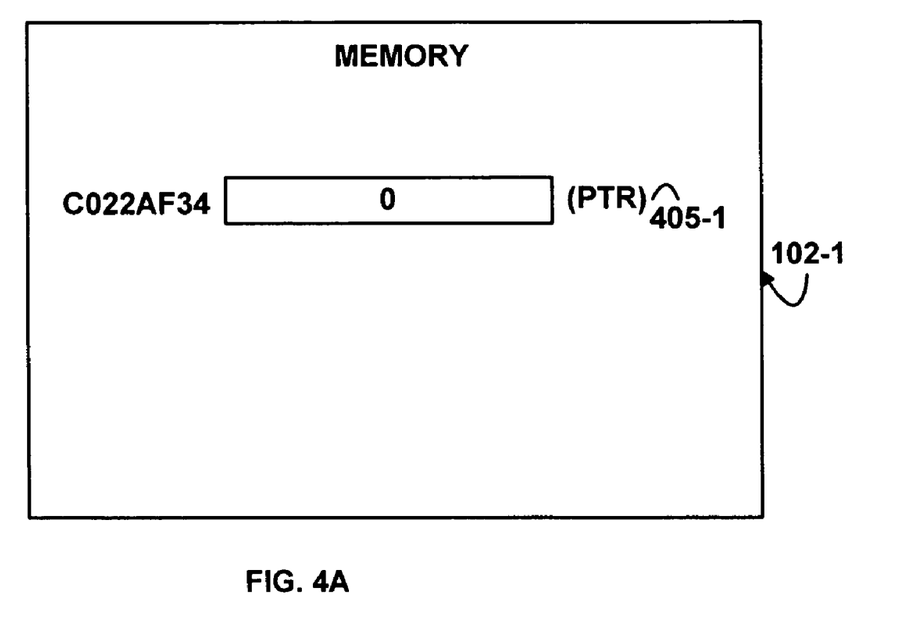
FIG. 4A depicts a block diagram of an example page in memory with a basing pointer that is not yet set, according to an embodiment of the invention.

FIG. 4A depicts a block diagram of an example page in the memory 102-1 (an instance of the memory 102 from FIG. 1) with a basing pointer PTR 405-1 that is not yet set, according to an embodiment of the invention. The basing pointer PTR 405-1 (corresponding to the statement 305 and the instruction 320) is illustrated at memory address "C022AF34," and the contents of this memory address are "0," which indicates that the pointer PTR 405-1 is not yet set or initialized. In another embodiment, any appropriate contents may be used to indicate that a pointer is not set or initialized. The variable X is not shown in the memory 102-1 in FIG. 4A because the interpreter 160 does not yet know the address of the variable X since the pointer PTR 405-1 is not yet set. The addresses and data illustrated in FIG. 4A are examples only, and in other embodiments any appropriate addresses and data may be used.

Figure 4B:
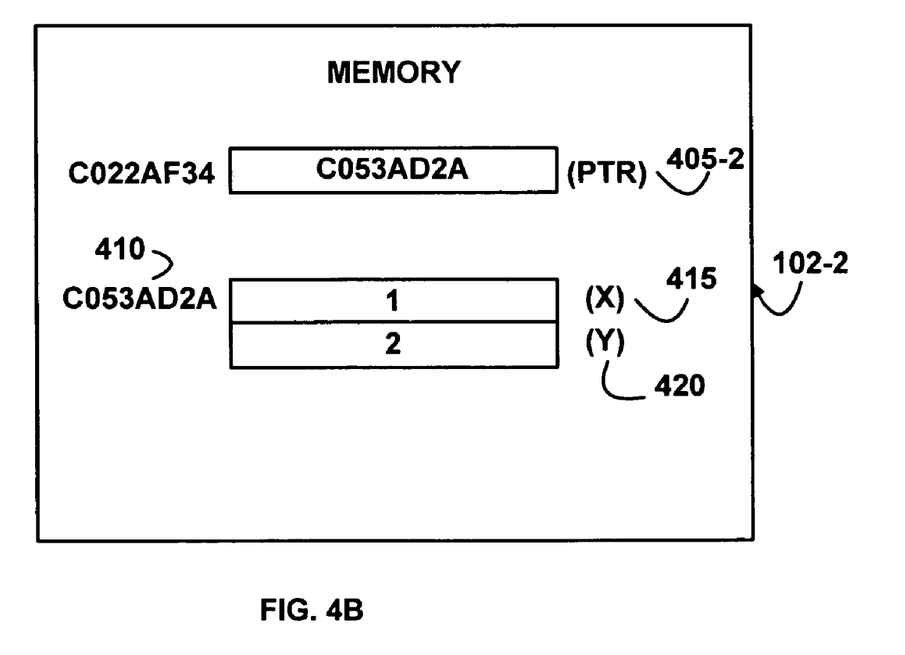
FIG. 4B depicts a block diagram of an example page in memory with a basing pointer that has been set, according to an embodiment of the invention.

FIG. 4B depicts a block diagram of an example page in the memory 102-2 (an instance of the memory 102 from FIG. 1) with a basing pointer PTR 405-2 that has been set, according to an embodiment of the invention. In this example, the basing pointer PTR 405-2 has contents of "C053AD2A," which is the address of storage location 410 in the memory 102-2, which contains the variables X 415 and Y 420. Using the example of FIG. 3B, the POFFSET 325 for the variable X 415 is zero, and the POFFSET 325 for the variable Y 420 is one since those are the values that need to be added to the contents of the PTR 410 (by the instruction 330), in order to access X 415 and Y 420, respectively.

Figure 5:
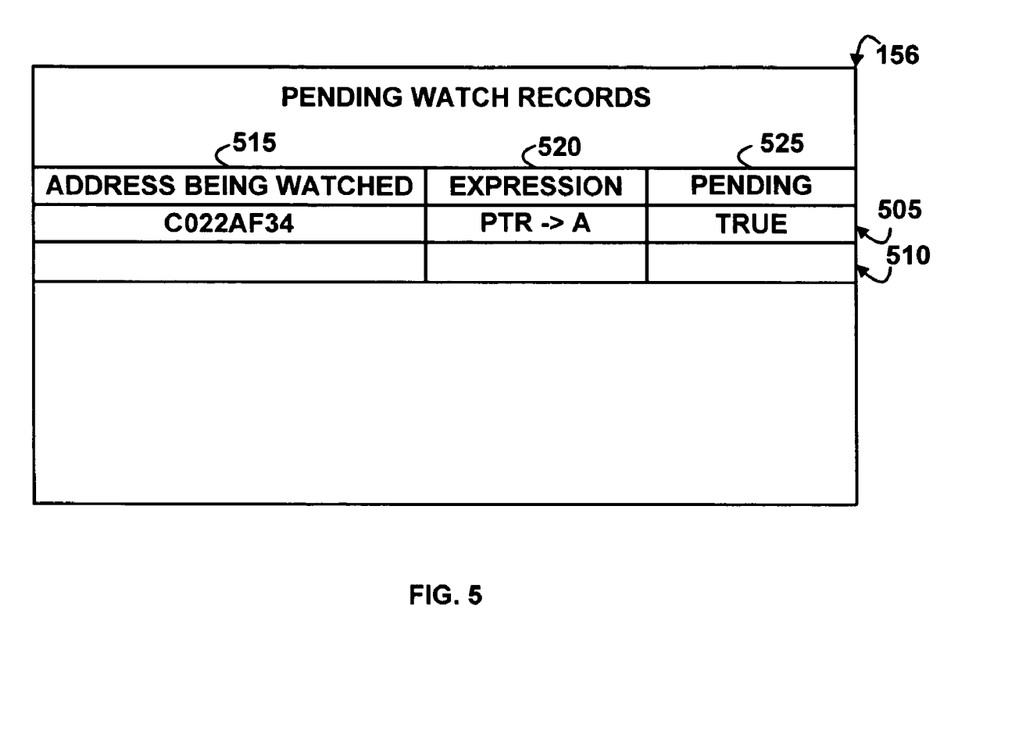
FIG. 5 depicts a block diagram of an example data structure for pending watch records, according to an embodiment of the invention.

FIG. 5 depicts a block diagram of an example data structure for the pending watch records 156, according to an embodiment of the invention. The example pending watch records 156 include records 505 and 510, but in other embodiments any number of records with any appropriate data may be present. Each of the records 505 and 510 include an address being watched field 515, an expression field 520, and a pending field 525, but in other embodiments, more or fewer fields may be present. The address being watched field 515 includes the address of the memory location (a pointer) that is currently being watched for modification. The expression field 520 includes the pointer expression that, such that after the memory contents at the address being watched 515 is modified, its result is to be watched next.

The pending field 525 indicates (true/false or yes/no) whether a watch is pending. If the pending field 525 indicates true or yes, then the address being watched 515 includes an address that is currently being watched for modification, and the expression field 520 contains a pointer expression whose result is to be watched next. If the pending field is false, then the memory contents at the address being watched 515 has already been modified, or was established correctly the first time the watch was set, so its watch is no longer pending.

In the example shown in FIG. 5, the pending field 525 for the record 505 contains "true," which indicates that an address watch is currently pending at "C022AF34," which is the address of the pointer PTR 405-1 (FIG. 4A), and the pointer PTR 405-1 has not yet been set to a valid address. Once the pointer PTR 405-2 (FIG. 4B) is set to a valid address ("C053AD2A" in the example of FIG. 4B), the interpreter 160 retrieves the pointer expression 520, evaluates it to yield the valid address "C053AD2A" and initiates an address watch breakpoint at the memory location 410 (FIG. 4B), as further described below with reference to FIGS. 6 and 7.

Figure 6:
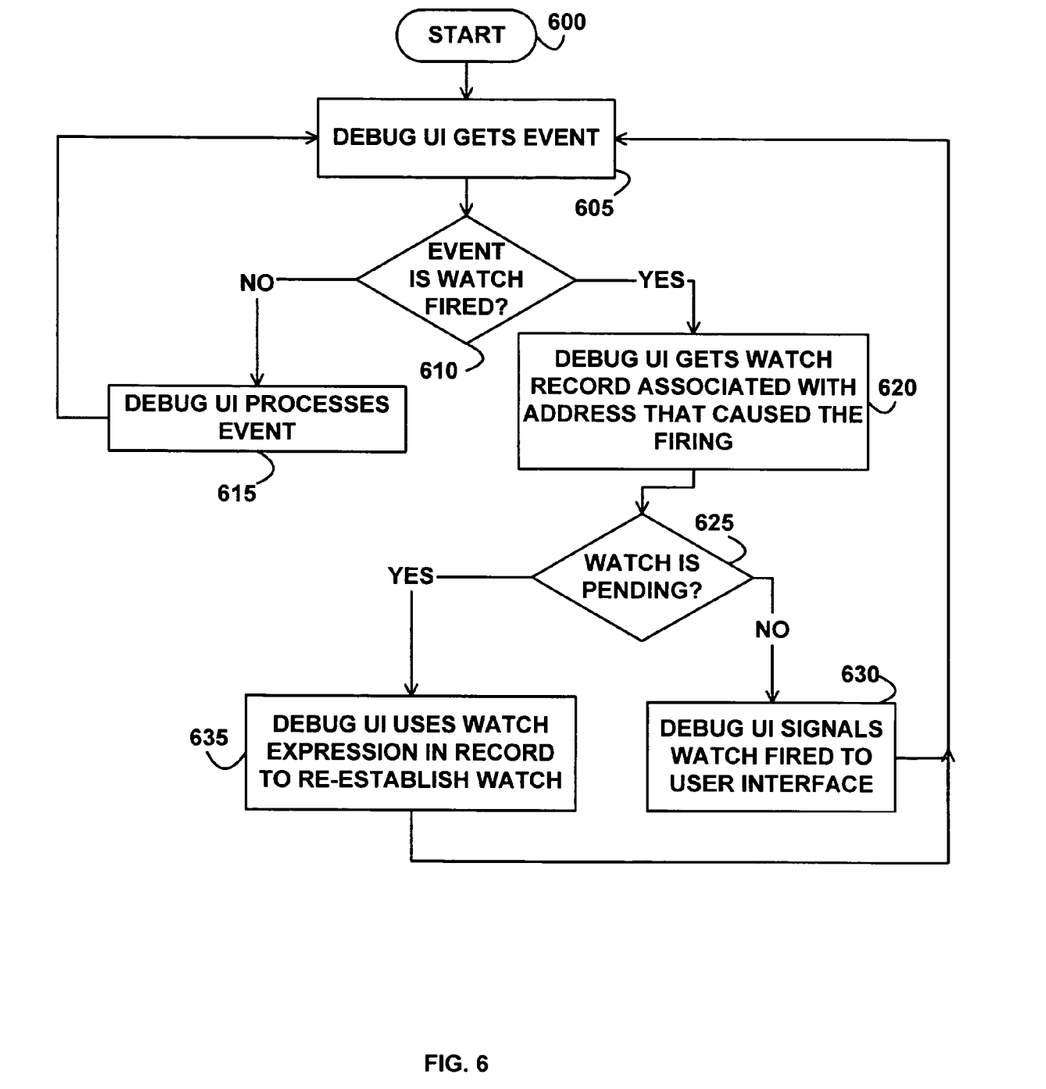
FIG. 6 depicts a flowchart of example processing for handling events, according to an embodiment of the invention.

FIG. 6 depicts a flowchart of example processing for handling events by the debug user interface 154, according to an embodiment of the invention. Control begins at block 600. Control then continues to block 605 where the debug user interface 154 receives an event. Control then continues to block 610 where the debug user interface 154 determines whether the event previously received at block 605 is a watch fired event.

If the determination at block 610 is false, then the received event is not a watch fired event, so control continues to block 615 where the debug user interface 154 processes other events, such as an event requesting a breakpoint at an instruction in the program 168 or an address watch breakpoint for a variable. For an address watch breakpoint request, the parser 158 parses the watch expression in the request to create the dcode program 170, which is then sent to the dcode interpreter 160. The parser 158 saves an indication that the interpreter 160 can check later at block 710 (FIG. 7). Control then returns to block 605, as previously described above.

If the determination at block 610 is true, then the received event is a watch fired event (address watches are initiated at blocks 635 of FIG. 6 and block 745 of FIG. 7, as further described below), so control continues to block 620 where the debug user interface 154 retrieves a watch record associated with the address that causes the watch breakpoint firing from the pending watch records 156 (FIG. 5). Control then continues to block 625 where the debug user interface 154 determines whether a watch is pending for this address by checking the pending field 525 (FIG. 5) in the retrieved record.

If the determination at block 625 is true, then a watch is pending for this address (the pending field 525 indicates true), so control continues to block 635 where the debug user interface 154 uses the expression 520 in the retrieved record from the pending watch records 156 to re-establish a watch. Thus, after the basing pointer has been initialized (described below with reference to FIG. 7), then the debug user interface 154 initiates a monitor or watch for a change to a variable via the basing pointer expression that was previously saved (described below with reference to FIG. 7). In another embodiment, the debug user interface 154 initiates a monitor or watch for a change to another basing pointer, which handles the scenario where a pointer expression contains multiple basing pointers (e.g., the pointer expression 310 of FIG. 3A), so each of the basing pointers is monitored or watched in turn. The debug user interface 154 further sets the pending field 525 to false. Control then returns to block 605, as previously described above.

If the determination at block 625 is false, then a watch is not pending for this address (the pending field 525 indicates false), so control continues to block 630 where the debug user interface 154 signals that the watch has fired on the user interface. Control then returns to block 605, as previously described above.

Figure 7:
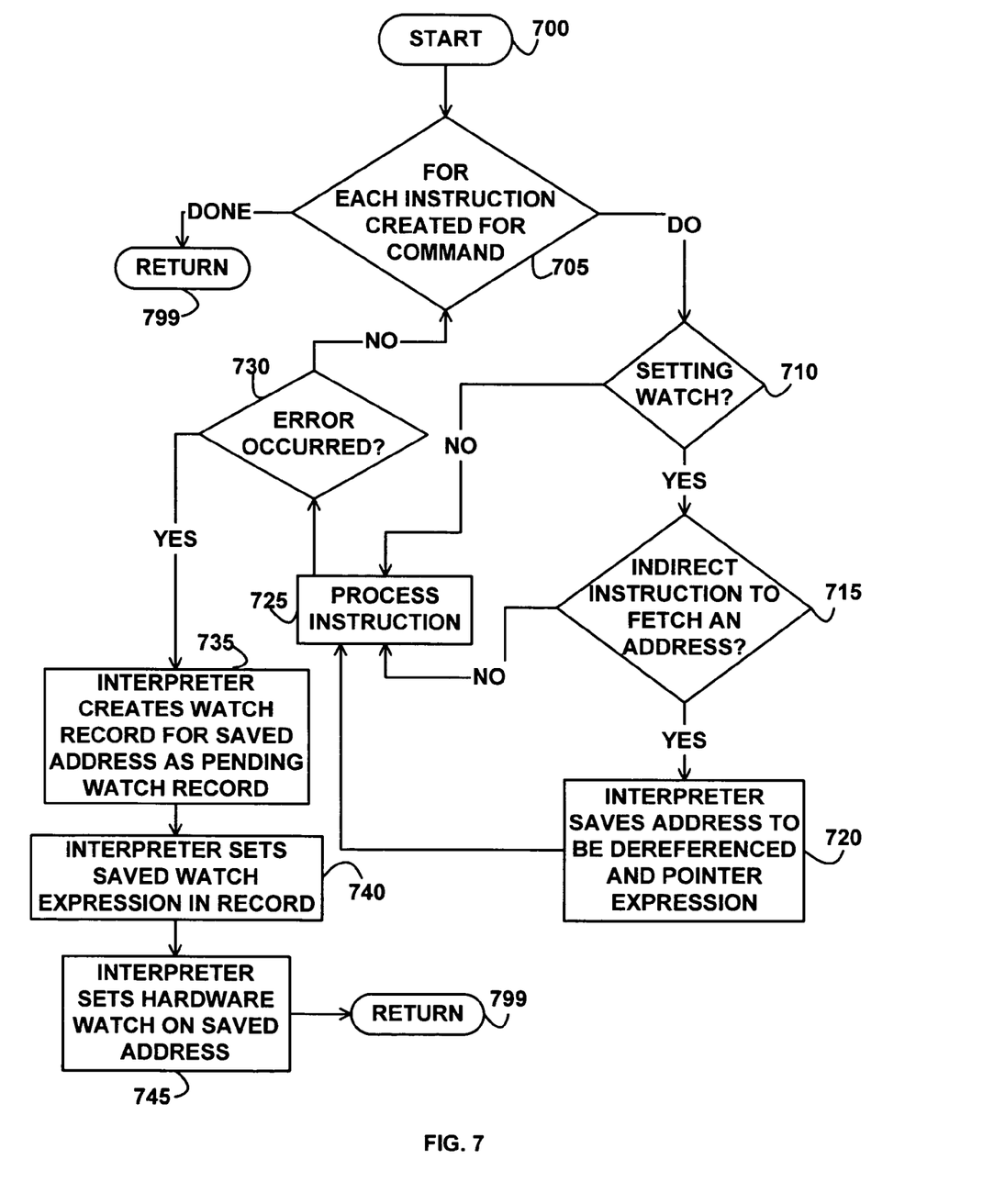
FIG. 7 depicts a flowchart of interpreting debug commands, according to an embodiment of the invention.

FIG. 7 depicts a flowchart of interpreting commands in the debug commands 200 by the interpreter 160, according to an embodiment of the invention. The logic of FIG. 7 is invoked once for each command (e.g., the command 305 or 310 illustrated in FIG. 3A) in the debug commands 200. Control begins at block 700. Control then continues to block 705 where the interpreter 160 enters a loop executed once for each instruction in the dcode 170 created for the command. For example, the loop is executed once each for the instructions 315, 320, 325, and 330, which were created from the command 305, as previously described above with reference to FIGS. 3A and 3B.

So long as an instruction unprocessed by the loop remains, control continues from block 705 to block 710 where the interpreter 160 determines whether an address watch breakpoint is being set, as previously described above with reference to block 615 in FIG. 6. If the determination at block 710 is true, then an address watch breakpoint has been set, so control continues to block 715 where the interpreter 160 determines whether the current instruction is an instruction that uses indirect addressing to fetch an address. An example of an indirect instruction is the LDI (load indirect) instruction 320 in FIG. 3B, which in an embodiment comes from a variable being referenced via a basing pointer expression, but in other embodiments any appropriate instruction that uses indirect addressing may be used.

If the determination at block 715 is true, then the current instruction is an indirect instruction, so control continues to block 720 where the interpreter 160 saves the address to be dereferenced by the current instruction and also saves the basing pointer expression of the current instruction. For example, if the current instruction is the LDI (load indirect) PTR 320 (FIG. 3B), then the address to be dereferenced is the memory address of the pointer "PTR," which is illustrated in FIGS. 4A and 4B as "C022AF34." Thus, in this example at block 720, the interpreter 160 saves the address "C022AF34" and also saves the pointer expression "PTR->A." Control then continues to block 725 where the interpreter 160 processes the current instruction, including directing the processor 101 to execute the current instruction.

Control then continues to block 730 where the interpreter 160 determines whether execution of the current instruction resulted in an error. Thus, the interpreter 160 determines whether an error results from use of a basing pointer that has not been set.

If the determination at block 730 is true, then the current instruction when executed on the processor 101 resulted in an error, so control continues to block 735.

The add instruction 330 (FIG. 3B) results in an error if the pointer PTR 405-1 (FIG. 4A) does not contain a valid memory address since the pointer PTR 405-1 has not yet been set. In response to the error, at block 735, the interpreter 160 creates a record (e.g., the record 505 or 510 illustrated in FIG. 5) in the pending watch records 156, sets the address previously saved at block 720 into the address field 515, and sets the pending field 525 in the record to true. Control then continues to block 740 where the interpreter 160 sets the expression field 520 in the record to be the pointer expression previously saved at block 720. Control then continues to block 745 where the interpreter 160 sets a hardware watch on the saved address (the address of the pointer), which in this example is the address of PTR (C022AF34 in this example). Thus, the interpreter 160 monitors for an initialization of the basing pointer. By setting the hardware watch, the interpreter 160 directs the processor 101 to raise an interrupt when the contents at the address (C022AF34 in this example) are modified, which in this example is the PTR 405-2. Control then continues to block 799 where the logic of FIG. 7 returns.

If the determination at block 730 is false, then the current instruction executed successfully, so control returns to block 705 where the current instruction is set to be the next instruction in the dcode 170, and execution of the loop continues, as previously described above.

If the determination at block 715 is false, then the current instruction is not an indirect instruction, so control continues to block 725, as previously described above.

If the determination at block 710 is false, then an address watch breakpoint has not been set, so control continues to block 725, as previously described above.

After every instruction has been processed by the loop that begins at block 705, control continues from block 705 to block 799, where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving a request for an address watch breakpoint to a variable used by a program;
   determining that the variable is referenced via a basing pointer expression, wherein the basing pointer expression specifies a basing pointer that is not set to a valid address;
   in response to the determining that the variable is referenced via the basing pointer expression, saving the basing pointer expression;
   in response to the determining that the variable is referenced via the basing pointer expression, monitoring for an initialization of the basing pointer, wherein the monitoring for the initialization further comprises directing a processor that executes the program to raise an interrupt when the contents at an address of the basing pointer are modified and stop execution of the program at an instruction in the program that modifies the contents at the address of the basing pointer; and
   after the basing pointer has been initialized, monitoring for a change to the variable via the basing pointer expression that was saved.

2. The method of claim 1, wherein the basing pointer expression comprises a plurality of basing pointers and wherein the monitoring for the initialization further comprises monitoring for the initialization of each of the plurality of basing pointers.

3. The method of claim 2, further comprising:
   signaling via a user interface that the address watch breakpoint has been hit in response to the monitoring for the change to the variable.

4. The method of claim 1, wherein the determining further comprises:
   detecting a load indirect instruction.

5. The method of claim 1, wherein the determining further comprises:
   detecting an error from use of the basing pointer.

6. An apparatus comprising:
   means for receiving a request for an address watch breakpoint to a variable used by a program;
   means for determining that the variable is referenced via a basing pointer expression, wherein the basing pointer expression specifies a basing pointer that is not set to a valid address;
   means for saving the basing pointer expression in response to the means for determining that the variable is referenced via the basing pointer expression;
   means for monitoring for an initialization of the basing pointer, wherein the means for monitoring for the initialization further comprises directing a processor that executes the program to raise an interrupt when the contents at an address of the basing pointer are modified and stop execution of the program at an instruction in the program that modifies the contents at the address of the basing pointer, in response to the means for determining that the variable is referenced via the basins pointer expression; and
   means for monitoring for a change to the variable via the basing pointer expression that was saved after the basins pointer has been initialized.

7. The apparatus of claim 6, wherein the basing pointer expression comprises a plurality of basing pointers and wherein the means for monitoring for the initialization further comprises means for monitoring for the initialization of each of the plurality of basing pointers.

8. The apparatus of claim 6, wherein the means for determining further comprises:
   means for detecting a load indirect instruction.

9. The apparatus of claim 6, wherein the means for determining further comprises:
   means for detecting an error from use of the basing pointer.

10. The apparatus of claim 7, further comprising:
    means for signaling via a user interface that the address watch breakpoint has been hit in response to the means for monitoring for the change to the variable.

11. A computer-readable storage medium encoded with instructions, wherein the instructions when executed comprise:
    receiving a request for an address watch breakpoint to a variable used by a program;
    determining that the variable is referenced via a basing pointer expression, wherein the basing pointer expression specifies a basing pointer that is not set to a valid address;
    in response to the determining that the variable is referenced via the basing pointer expression, saving the basing pointer expression;
    in response to the determining that the variable is referenced via the basing pointer expression, monitoring for an initialization of the basins pointer, wherein the monitoring for the initialization further comprises directing a processor that executes the program to raise an interrupt when the contents at an address of the basing pointer are modified and stop execution of the program at an instruction in the program that modifies the contents at the address of the basing pointer; and after the basing pointer has been initialized, monitoring for a change to the variable via the basing pointer expression that was saved.

12. The computer-readable storage medium of claim 11, wherein the determining further comprises:

detecting a load indirect instruction.

13. The computer-readable storage medium of claim 11, wherein the determining further comprises:

detecting an error from use of the basing pointer.

14. The computer-readable storage medium of claim 13, wherein the error results from adding an offset to contents of the basing pointer.

15. The computer-readable storage medium of claim 11, further comprising:

signaling via a user interface tat the address watch breakpoint has been hit in response to the monitoring for the change to the variable.

16. A computer system comprising:

a processor; and a main memory encoded with instructions, wherein the instructions when executed on the processor comprise:

receiving a request for an address watch breakpoint to a variable used by a program, determining that the variable is referenced via a basing pointer expression, wherein the basing pointer expression specifies a basing pointer that is not set to a valid address, in response to the determining that the variable is referenced via the basing pointer expression, saving the basing pointer expression, in response to the determining that the variable is referenced via the basing pointer expression, monitoring for an initialization of the basing pointer, wherein the monitoring for the initialization further comprises directing a processor that executes the program to raise an interrupt when the contents at an address of the basing pointer are modified and stop execution of the program at an instruction in the program that modifies the contents at the address of the basing pointer, and after the basing pointer has been initialized, monitoring for a change to the variable via the basing pointer expression that was saved.

17. The computer system of claim 16, wherein the determining further comprises:

detecting an error from use of the basing pointer.

18. The computer system of claim 17, wherein the error results from adding an offset to contents of the basing pointer.

19. The computer system of claim 16, wherein the instructions further comprise:

signaling via a user interface that the address watch breakpoint has been hit in response to the monitoring for the change to the variable.

20. The computer system of claim 16, wherein the basing pointer expression comprises a plurality of basing pointers and wherein the monitoring for the initialization further comprises monitoring for the initialization of each of the plurality of basing pointers.

\* \* \* \* \*